United States Patent [19]

Soltan et al.

[11] 4,299,447
[45] Nov. 10, 1981

[54] LIQUID CRYSTAL FIBER OPTICS LARGE SCREEN DISPLAY PANEL

[75] Inventors: Parviz Soltan, San Diego; Paul C. Fletcher, El Cajon, both of Calif.

[73] Assignee: The United States of America as represented by the Secretary of the Navy, Washington, D.C.

[21] Appl. No.: 52,649

[22] Filed: Jun. 27, 1979

[51] Int. Cl.³ .............................................. G02F 1/133
[52] U.S. Cl. .................................. 350/334; 350/331 R; 350/345; 350/339 F; 350/96.25
[58] Field of Search .................. 350/331 R, 334, 345, 350/342, 96.25, 339 F

[56] References Cited

U.S. PATENT DOCUMENTS

| | | | |
|---|---|---|---|
| 3,723,651 | 3/1973 | Gorog | 350/342 X |
| 3,764,211 | 10/1973 | Morse | 350/342 X |
| 3,824,604 | 7/1974 | Stein | 350/331 R X |
| 3,853,658 | 12/1974 | Ney | 350/96.25 X |
| 3,891,309 | 6/1975 | Bonne | 350/334 X |
| 3,909,109 | 9/1975 | Aurenz | 350/96.25 |
| 4,006,968 | 2/1977 | Ernstoff et al. | 350/339 F |
| 4,195,915 | 4/1980 | Lichty | 350/338 X |

OTHER PUBLICATIONS

Brandon, "Display Device", *IBM Technical Disclosure Bulletin,* vol. 19, p. 691, Jul. 1976.

*Primary Examiner*—Edward S. Bauer
*Attorney, Agent, or Firm*—Richard S. Sciascia; Ervin F. Johnston; Thomas Glenn Keough

[57] ABSTRACT

A display screen shows a number of alphanumeric characters in accordance with computer originating signals. These signals are fed to a liquid crystal panel which responsively vaires its opacity and, preferably, tapered fiber optics extend from one side of the liquid crystal panel to the screen. In one mode light originating from a high intensity source behind the screen is transmitted through the fiber optics. In another mode light from the front of the screen is reflected from a reflector surface behind the liquid crystal panel to the display screen. Either mode of operation allows the fabrication of a matrix of a number of liquid crystal panels and their associated fiber optics to provide an expanded display screen. Thus, an expanded visual presentation is read out from a computer or similar source of controlling signals to assure that several observers are reliably informed.

3 Claims, 7 Drawing Figures

LIQUID CRYSTAL FIBER OPTICS LARGE SCREEN DISPLAY PANEL

BACKGROUND OF THE INVENTION

Large screen displays of information in alphanumeric and graphic form are being used by management and the technical sector to a much greater degree than before. Large screen displays enable a number of users to simultaneously extract information so that responsive action may be taken. Movie projectors and opaque projectors have been successfully used and are particularly useful at symposiums, lectures, etc., where a large audience is gathered in a spacious auditorium or projection room.

Unfortunately, where space at a premium and where several people must function in synchronization, there simply is not room for the movie or opaque projectors. Particularly in the close confines of a submersible or an instrument laden aircraft, scientists and technicians must act on simultaneously presented data and coordinate their work. Conventional projectors can't be used since they take up too much space, impose a rather large power consumption, are relatively delicate and have high maintenance requirements.

Later developments use electroluminescent panels and arrays of light emitting diodes. However, these tend to be ineffective from a cost standpoint and are susceptible to washout by the ambient light. Size constraints and electronics' requirements have also diminished the appeal of these designs.

A more recent display device relies upon a liquid crystal panel actuated by a thin-film transistor gate. An instantaneous response from a computer, for example, actuates the liquid crystal panel for responsive readouts.

There is a continuing need in the state-of-the-art for a cost effective display panel having the capability for providing a clear readout which is compact and reliable enough for use in submersibles and aircraft.

SUMMARY OF THE INVENTION

The present invention is directed to providing an improvement for a display panel having a high intensity light source for projecting a plurality of alphanumeric characters on the screen of the display panel. A liquid crystal panel is interposed between the light source and the screen for changing its transmissivity in response to control signals generated in a computer. A multitude of tapered optical fibers provide an expanded readout on the screen as they transmit light from the back wall of the liquid crystal panel to the screen. A modification relies on light in front of the screen to reflect off the liquid crystal, through tapered blocks of fibers and through the screen. A number of such blocks arranged in a matrix can provide an expanded, noninterrupted display.

It is a prime object of the invention to provide an improved display panel readout.

Yet another object of the invention is to provide a display panel employing tapered optical fibers and at least one liquid crystal panel.

Yet another object is to provide a high resolution display panel having optical fibers with first ends adjacent a liquid crystal panel and the other ends terminating in the display panel.

Yet another object is to provide a live (on line) display for passing light from a high intensity source to a screen.

A further object is to provide tapered optical fibers to enlarge the display.

Another object is to provide a display operating both in the transmissive mode or the reflective mode, depending where the light source is situated. This is called transflective.

Another object is to provide for expanded, uninterrupted displays fabricated from a number of liquid crystal panels and associated tapered blocks of optical fibers.

A further object is to provide a display including selective filters to provide color changeability.

Another object is to advantageously employ ambient light when employed in the reflective mode.

Still another object is to provide a display panel potted in a manner to better withstand environmental effects.

A further object is to provide a highly reliable, low maintenance and low production cost display.

These and other objects of the invention will become more readily apparent from the ensuing description when taken with the drawings.

DESCRIPTION OF THE PREFERRED EMBODIMENTS

Figure 1:
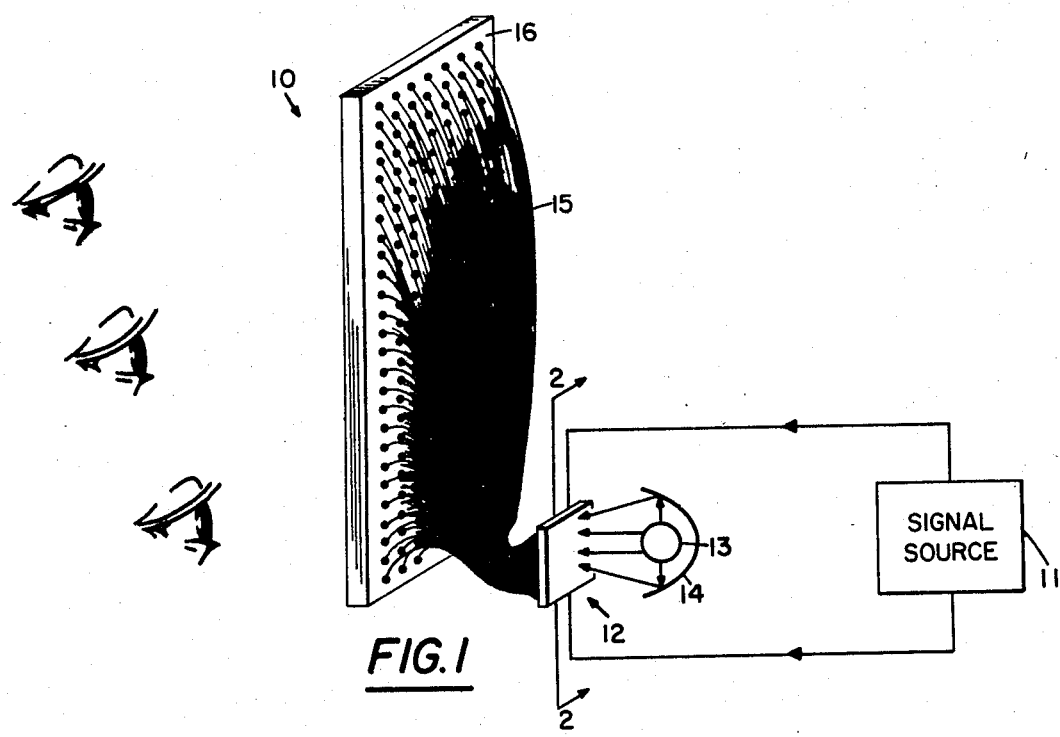
FIG. 1 is a schematic, isometric depiction of the one embodiment of the invention.

Referring to FIG. 1 of the drawings, a display unit 10 is in the process of providing a number of the viewers with a visual presentation of alphanumeric characters, figures, etc. The information of the display originates from a signal source 11 which optionally is a computer readout, sensor array, signals, or an otherwise suitable signal source for driving a modulator unit 12.

The makeup of the modulator unit 12 will be elaborated on below; however, let it suffice to say at this point that it serves to selectively change its transmissivity so that high intensity light emanating from a light source 13 and reflected by a concave reflector 14 is channeled through the unit and into a multitude of tapered optical fibers 15.

The tapered fibers are well known in the art. Tapered fibers, or individual high attenuation fibers only tapered at ends may be employed since they need not extend more than several inches. They have their smaller ends located adjacent the modulator unit and their larger ends coupled to a diffuse plate 16 which forms a display screen.

Figure 3A:
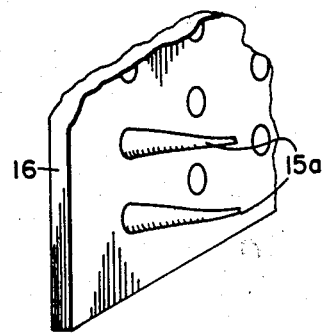
FIGS. 3a and 3b are representations of another detail and variations thereof in the invention.
Figure 3B:
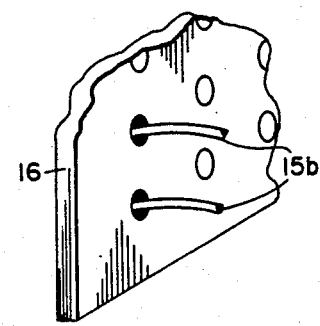

Noting FIGS. 3a and 3b, two typical ways are shown by which the fibers and plate are coupled. Fibers 15a are flared outwardly and cemented to the diffuse plate. Fibers 15a are inserted into holes provided in the plate and heat treated in place. In either case, the diffuse plate is frosted or otherwise fabricated to scatter the light transmitted by the fibers and enhance the image.

The light source is selected to have a high intensity. A short arc xenon lamp of at least 75 watts has been found to be a suitable light source, although a standard 100 watt light bulb has been used with satisfactory results. The concave reflector 14 is a highly polished surface and has a radius of curvature to assure that the exposed area of the modulator unit is more or less uniformly illuminated.

Figure 2A:
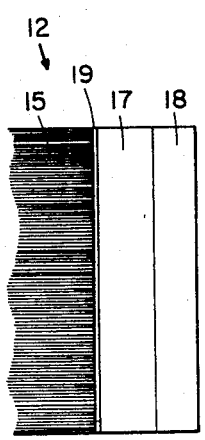
FIGS. 2a and 2b show cross-sectional variations of the invention taken generally along lines 2—2 in FIG. 1.
Figure 2B:
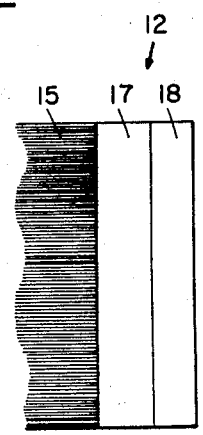

Looking to FIGS. 2a and 2b, the heart of modulator unit is a liquid crystal panel 17. The matrix addressing panels of this type are well established in the art and have the property of varying the transmissivity in a matrix of cells when an electric field is impressed across them. The electronics for switching the electric fields varies from one manufacturer to another. Recently, some simplified, compact designs have included thin-film transistor circuitry as an integral part of their panels to effect the field switching operation. Typically, a panel manufactured by the Westinghouse Corporation under the designation of Liquid crystal-Thin film Transistor (LC-TFT) panel has properties suitable for this embodiment.

In the typical panel an individual liquid crystal cell is approximately 30 by 30 mils so that the actual light modulating portion is approximately corresponds to an area measuring 25 by 25 mils. The field effect, twisted nematic liquid crystals (LX FE-09) yields better than a 25% transmission through the cells (light valves) with a good on-off contrast of about 30 to 1. The liquid crystal panel has a birefringent liquid (about 10 microns thick) sandwiched between transparent electrodes.

A filter 18 is interposed between the liquid crystal panel and the light source. The filter functions to block heat due to IR radition.

On the other side of the liquid crystal panel, the multitude of tapered fibers are brought in as close a proximity to the liquid crystal as possible. This is done primarily to avoid the problems associated with excessive scattering and refraction of the light as it passes through the crystal into the tapered fibers. For that reason, in the embodiment depicted in FIG. 2a, a thin transparent sheet of glass or clear plastic 19 covers the one side of the liquid crystal panel. The thin plate is bonded onto the liquid crystal and functions as a wall of the crystal. The narrow ends of the tapered fibers 15 are polished flat and cemented by a suitable optical cement to the exposed surface of the thin plate. The individual fibers are arranged in alignment with individual ones of the cells of the liquid crystal. The flared ends of the fibers are arranged on the display panel to provide a readout in accordance with proven techniques. A modification appears in FIG. 2b. The ends of the fiber optics are bonded or fused together to form a closure for the liquid crystal. Scattering is further reduced.

Fibers having a 20 mil outer diameter are common in this application and flare outwardly to a dimension of at least 100 mils by the time they reach the diffuse plate. Looking once again to FIG. 3a, fibers 15a, are configured so as to flare outwardly where they are cemented to the diffuse plate. Alternately, fibers 15b are inserted in holes in the diffuse plate where they are spot heated and fitted in the holes. Irrespective of which method is chosen to anchor the fibers in the diffuse plate, the effect is much the same, that is, there is an increased area where light passes to result in an increased dimensional presentation of the information presented in smaller scale on the liquid crystal. A further enlargement or an enhancement of the transmitted image is assured by the diffuse plate itself, that is, the plate is a thin layer of mylar which will diffuse light or it can be an ordinary glass or plastic plate having been treated with a solution of hydrofluoric acid to give it a frosted appearance.

The described display unit has a capability for permitting a number of observers to simultaneously benefit from the information contained in a computer or sensors so that immediate responsive action may be taken. Signals from the signal source actuate the liquid crystal in accordance with well established techniques and high intensity light from source 13 is directed toward the liquid crystal. Suitable ones of the individual cells are actuated so as to pass light from the source to the diffuse plate via the tapered fiber optics. This results in an immediate expanded presentation of computer originating information.

For example, the information that actuates a six by six inch high resolution (200 lines per inch) liquid panel can be transmitted to a four by four foot (25 line per inch) display via the fiber optic image expanders. This information can be immediately changed or updated in accordance with signals originating from the source. Several such display units can be contiguously arranged to cover, if wanted, the entire wall. Such a display resists the effects of washout from ambient sources.

Figure 4:
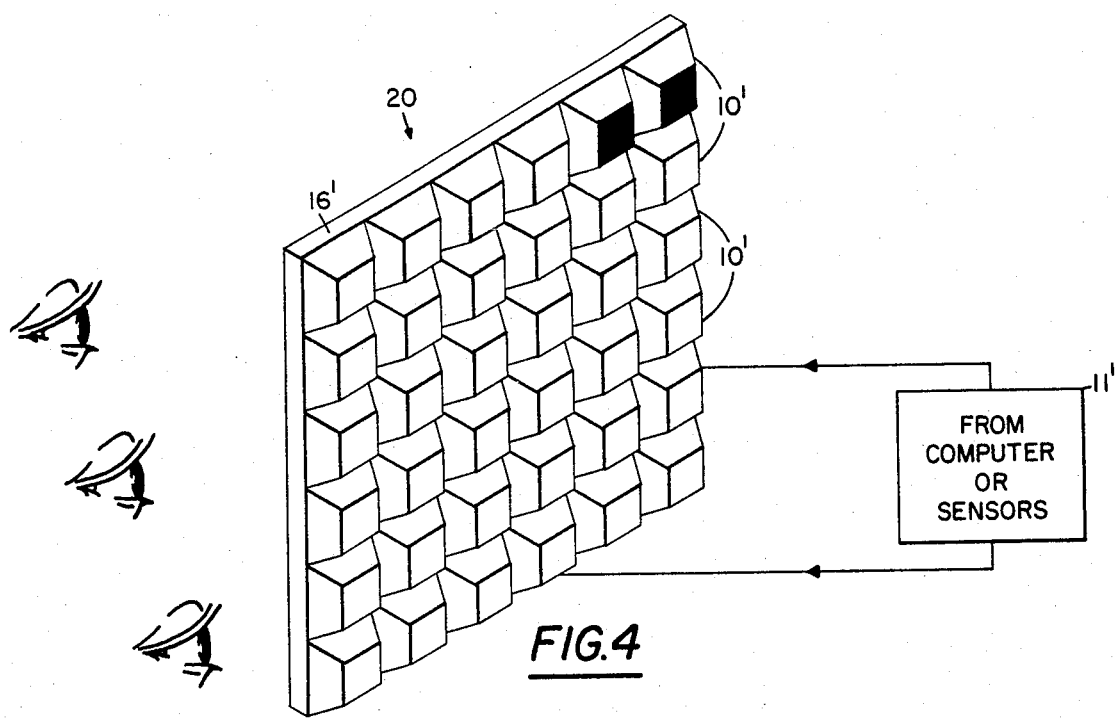
FIG. 4 is an isometric depiction of another embodiment of the invention.
Figure 5:
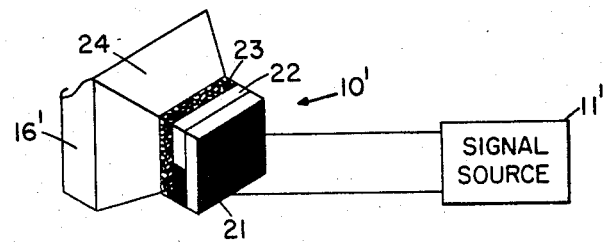
FIG. 5 shows in greater detail a constituient component of the embodiment of FIG. 4.

Another embodiment of the invention differs from the aforegoing design in that this embodiment relies on the optical display of information by a reflective mode of operation whereas the former relied on a transmissive mode. Referring to FIGS. 4 and 5, the display panel 20 is fabricated from a number of display units, 10', each driven by a suitable signal source 11', only two display units being shown connected to the source to avoid cluttering the drawings. The source can be a computer originating signal source or a sensor readout or any one of a variety of driving devices capable of actuating a liquid crystal display unit.

Each display unit includes a modulator unit 12'. The modulator unit has a flat reflecting surface 21 connected to suitable color filters 22. A block 24 of tapered optical fibers physically replaces the front glass plate of each of the liquid crystal cells and serves to magnify the information that has been programmed onto the liquid crystal by the signal source. The tapered optical fiber block can be no more than a bundle of fibers fused together for convenience in handling, among other things. Such tapered fiber optic blocks are commercially marketed, one such model being offered by the Galileo Electro-Optics Corporation at Sturbridge, Massachusetts. The flared out ends of the tapered optical fiber blocks are cemented or otherwise suitably affixed to a diffuse plate 16' which has its surface frosted or otherwise prepared to enhance the reflected image.

In this reflecting mode, light coming from the screen side of the display panel shines down through the tapered fibers and onto the liquid crystal. When the liquid crystal is suitably actuated (on condition) to allow all or portions of the light to pass through it, these portions impinge upon the reflector chip where information is reflected back through the color filter, the aligned liquid crystal, through the fibers and onto the diffuse plate where observers can discern the information content programmed into the liquid crystal.

A novel feature of this embodiment, and for that matter, the first embodiment, is that an expanded display screen can be fabricated by placing display units 10 or 10' adjacent one another (mosiac approach) in a contiguous relationship until the desired matrix is formed. Contemporary displays using liquid crystals alone and not using tapered fibers to expand or enhance the image are limited to a 2 by 2 matrix since the drivers and connectors for each of the liquid crystal chips create a peripheral separation or a discontinuity when a more than 2 by 2 display is desired. This discontinuity is distracting to observers and has imposed size restrictions for employing several small panels to make a larger one.

Such a limitation does not hamper the design of a continuous expanded display employing the display units of the present invention. The drivers, scanners, and the connectors of the smaller liquid crystals of the present invention are masked off and actually are located behind the actual display surface provided by the expanding tapered fiber optics. A continuous expanded screen is therefore free of any interruptions which would otherwise distract an observer.

Both the embodiments can be fabricated to have no more than a few inches in depth. When these designs are potted in an epoxy type resin 25, a compact, rugged and highly reliable display is created, the lateral size and uses of which are limited only by imagination and ingenuity of the user.

Obviously, many other modifications and variations of the present invention are possible in the light of the above teachings. It is therefore to be understood that within the scope of the appended claims the invention may be practiced otherwise than as specifically described.

What is claimed is:

1. In an apparatus having a reflective surface on one side of a liquid crystal panel to function in a reflective mode through a diffuse screen for displaying a plurality of alphanumeric characters and graphic information thereon, an improvement therefor is provided comprising:

a plurality of liquid crystal cells located behind the screen, the liquid crystal cells being adjacent to thin film transistor layers to form liquid crystal panels, and a fused block of tapered optical fibers extending between each liquid crystal panel and the diffuse screen, the fused blocks of tapered optical fibers form the front plates of the liquid crystal cells and the light is transmitted through the fused blocks of tapered optical fibers, through the liquid crystal cells, then is reflected by the reflecting surface and then is transmitted back through the liquid crystal cells, the fused blocks of tapered optical fibers and the diffusing screen for transmitting lighted alphanumeric and graphic information to effect an expansion of the information.

2. An improvement according to claim 1 in which there are provided a plurality of sets of the liquid crystal panels including fused blocks of optical tapered fibers.

3. An improvement according to claim 2 in which the plurality of sets of liquid crystal panels including the fused blocks of optical fibers are arranged in a matrix of greater than two by two sets of the liquid crystal panels including fused blocks of optical fibers to provide an uninterrupted large screen.

* * * * *